Patented Sept. 4, 1951

2,566,376

UNITED STATES PATENT OFFICE 2,566,376

BETA-TERTIARY AMINOETHANOL ETHERS OF DIARYL PYRIDYL CARBINOLS

Robert S. Shelton, Mariemont, and Charles H. Tilford, Silverton, Ohio, assignors to The Wm. S. Merrell Company, Cincinnati, Ohio, a corporation of Delaware No Drawing. Application November 23, 1949, Serial No. 129,181

2 Claims. (Cl. 260—247.7)

This invention relates to new products which are useful in combating, reducing or minimizing the physiological effects of histamine and other allergens, e. g., for the relief of hay-fever, asthma of allergenic origin, urticaria, and the like.

The new compounds of the invention are substituted 2-picolines in which the carbon atom attached to the pyridine ring in the 2-position is substituted by one aminoethoxy and by two aryl radicals, and are represented by the formula

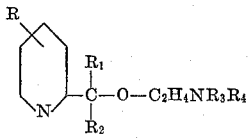

in which R is a hydrogen atom or a methyl or ethyl radical, $R_1$ and $R_2$ are the same or different aryl radicals such as the phenyl radical, a tolyl radical, a chlorophenyl radical or a methoxyphenyl radical, and $R_3$ and $R_4$ are methyl or ethyl radicals and are the same or different. Also, $R_3$ and $R_4$ may be joined together to form a cyclic structure, as where N, $R_3$ and $R_4$ form the piperidine or morpholine radical.

The compounds are thus the ethers of certain beta-tertiary-aminoethanols and carbinols of the formula

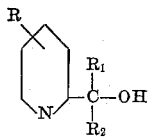

in which R, $R_1$ and $R_2$ have the significance given above.

The new compounds are basic, and will ordinarily be used in the form of an acid addition salt, i. e., as the hydrochloride, hydrobromide, sulfate, succinate, phosphate, glycolate, acetate, tartrate, levulinate, or the like, by oral administration in the form of tablets or other suitable form. The hydrochlorides and hydrobromides are white, crystalline materials. The free bases are distillable under vacuum and may be converted to the salts by simple neutralization with the required amount of acid, while the acid addition salts may be converted to the free base by treatment with caustic or carbonated alkali in the usual way.

The new compounds are conveniently prepared by heating a carbinol of the formula just stated with an aminoethyl chloride of the formula

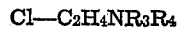

in the presence of sodium, with purification of the free base product by distillation, or crystallization, or by conversion to a salt followed by crystallization. This will be illustrated by the following specific example, but the invention is not limited thereto.

*Example.*—2 - [alpha - (2 - dimethylaminoethoxy) -alpha-phenylbenzyl]-pyridine.—A mixture of 52 grams (0.2 mole) of alpha,alpha-diphenyl-2-pyridinemethanol (Emmert et al., Ber. 72B, 1188 (1939); 74, 714 (1941), 4.6 grams (0.2 mole) of sodium, and 200 ml. of dry toluene was refluxed with stirring over a period of 1-2 hours. Then a solution of 27 grams (0.25 mole) of β-dimethylaminoethyl chloride in 100 ml. of dry toluene was added over a period of 2 hours with stirring and refluxing being continued for an additional 16 hours. About 200 ml. of water was added to the cooled reaction mixture, and the toluene layer was stirred with enough 10% hydrochloric acid to render the mixture just at the acid point to Congo red. The toluene layer was separated and contained unchanged starting material. The aqueous layer was made alkaline, extracted with petroleum ether and fractionally distilled to give 18 grams of desired aminoether distilling at 180–188° (0.3 mm.). The monohydrochloride was prepared by adding an aliquot portion of alcoholic hydrochloric acid to an ether solution of the aminoether, and when recrystallized from butanone melted at 186–187°.

Anal. calcd. for $C_{22}H_{24}ON_2$. HCl: Cl, 9.65. Found: Cl, 9.62.

The dihydrochloride melted at 175–176° with decomposition.

Anal. calcd. for $C_{22}H_{24}ON_2.2HCl$: Cl, 17.55. Found: Cl, 17.45.

Various modifications may be made in the procedure of the specific example to provide other compounds which fall within the scope of the present invention. For example, in place of the beta-dimethylaminoethyl chloride there may be substituted an equivalent number of moles of beta-diethylaminoethyl chloride, beta-(N-piperidino-ethyl chloride or beta-(N-morpholino)-ethyl chloride and the specific procedure repeated to produce, respectively, 2-[alpha-(2-diethylaminoethyl)-alpha-phenylbenzyl]-pyridine, 2-[alpha-(2-N-piperidinoethoxy)-alpha-phenylbenzyl]-pyridine and 2-[alpha-(2-N-morpholinoethoxy)-alpha-phenylbenzyl]-pyridine. Also, pyridine derivatives such as 2,4-lutidine, 2,6-lutidine or 4-ethyl-2-methylpyridine may be reacted in known manner with benzophenone to produce other carbinols falling within the generic formula given above which may be substituted in molecularly equivalent amount for the specific carbinol used in the example to produce still other compounds falling within the broad scope of this invention.

These compounds are highly effective as histamine antagonists, and are useful in the treatment of hay-fever, asthma, urticaria, and other ailments of the character associated with physiological reactions to histamine or the like, i. e., the so-called allergic responses or syndromes.

We claim:

1. The compounds of the generic formula

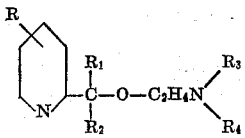

in which R is a substituent selected from the group consisting of the hydrogen atom and the methyl and ethyl radicals, $R_1$ and $R_2$ are aryl radicals selected from the group consisting of the phenyl radical and tolyl, chlorophenyl and methoxyphenyl radicals, and $R_3$ and $R_4$ are radicals selected from the group consisting of methyl and ethyl radicals, and in which $R_3$ and $R_4$ are joined to form with the nitrogen atom to which they are directly linked a radical selected from the group consisting of the piperidyl and morpholyl radicals.

2. 2-[alpha-(2-dimethylaminoethoxy)-alpha-phenylbenzyl]-pyridine.

ROBERT S. SHELTON.
CHARLES H. TILFORD.

No references cited.